(12) United States Patent
Ouellet et al.

(10) Patent No.: US 11,900,259 B2
(45) Date of Patent: *Feb. 13, 2024

(54) SYSTEMS AND METHODS FOR PARAMETER OPTIMIZATION

(71) Applicant: Kinaxis Inc., Ottawa (CA)

(72) Inventors: Sebastien Ouellet, Ottawa (CA); Phillip Williams, Ottawa (CA); Nathaniel Stanley, Ottawa (CA); Jeffery Downing, Ottawa (CA); Liam Hebert, Ottawa (CA)

(73) Assignee: Kinaxis Inc., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/973,201

(22) Filed: Oct. 25, 2022

(65) Prior Publication Data

US 2023/0059016 A1 Feb. 23, 2023

Related U.S. Application Data

(63) Continuation of application No. 16/865,707, filed on May 4, 2020, now Pat. No. 11,514,328.

(51) Int. Cl.
    *G06N 3/086* (2023.01)
    *G06F 16/901* (2019.01)
    *G06N 3/126* (2023.01)

(52) U.S. Cl.
    CPC ......... *G06N 3/086* (2013.01); *G06F 16/9027* (2019.01); *G06N 3/126* (2013.01)

(58) Field of Classification Search
    CPC ..... G06N 3/086; G06N 3/126; G06F 16/9027
    See application file for complete search history.

(56) References Cited

U.S. PATENT DOCUMENTS

| 9,081,870 | B2 | 7/2015 | Sax et al. |
| 2003/0055614 | A1* | 3/2003 | Pelikan ................. G06N 3/126 703/2 |
| 2018/0082209 | A1 | 3/2018 | Thompson |
| 2020/0074348 | A1 | 3/2020 | Chelian |
| 2020/0177032 | A1 | 6/2020 | Navarro et al. |

OTHER PUBLICATIONS

U.S. Appl. No. 16/865,707, Notice of Allowance dated Jul. 25, 2022.
U.S. Appl. No. 16/865,707, Office Action dated Jun. 10, 2022.

* cited by examiner

*Primary Examiner* — Manuel A Rivera Vargas
(74) *Attorney, Agent, or Firm* — Borden Ladner Gervais LLP; Jeffrey Coghlan

(57) ABSTRACT

Methods and systems that provide one or more recommended configurations to planners using large data sets in an efficient manner. These methods and systems provide optimization of objectives using a genetic algorithm that can provide parameter recommendations that optimize one or more objectives in an efficient and timely manner. The methods and systems disclosed herein are flexible enough to satisfy diverse use cases.

15 Claims, 12 Drawing Sheets

SYSTEMS AND METHODS FOR PARAMETER OPTIMIZATION

CROSS-REFERENCE

This application is a continuation of U.S. application Ser. No. 16/865,707, filed on May 4, 2020, which is hereby incorporated by reference.

TECHNICAL FIELD

The disclosure relates to parameter optimization of data, more particularly to systems and methods using genetic algorithms in parameter optimization.

BACKGROUND

Prior to analysis of large amounts of data by machine-learning algorithms, the data must be initially configured, and must be done so intelligently in order to obtain meaningful results from the machine-learning algorithms. The data is configured by setting one or more parameters. Often, there are too many parameters in a configuration for a user to choose from. In addition, there may be hundreds of thousands of different possible values for each parameter in the configuration. Often, the user selects the parameters (that define the configuration) based on personal judgement, which turns out not to be the best choice. The user has to experiment in terms of selecting the parameters that provide an optimal configuration. This takes time and is quite inefficient.

As an example, the configuration of supply chain parameters often requires decision-makers (such as administrators and planners) to choose parameters for the configuration. It is not immediately clear to decision-makers what choices are best or what the impacts of these choices are, compared to other configurations.

Continuing with the supply-chain example, a planner has as a goal to reduce the amount of late demands in a supply chain. That is, the objective (or KPI) is the amount of late demands. One possible parameter that can be used in the calculation of late demands is the order in which demands are filled across the entire supply chain. This parameter is called the transaction sequence, and is a sequence of unique numbers that defines in which order demands are fulfilled. That is, two demands cannot be filled simultaneously. The planner can initialize the transaction sequence, and evaluate the late demands. The planner may accept the results, or reset the transaction sequence, and re-evaluate the late demand to see if there is any improvement. This continues until there is no further improvement of the late demands. The resulting transaction sequence provides the optimized value of the late demand. However, there can be at least 70,000 different demands in a typical supply chain—requiring a planner to set at about 70,000 factorial different values for the demand priorities, or sequences. However, a systematic evaluation using 70,000 factorial different transaction sequences is computationally impossible to solve. This problem gets much more difficult when considering multiple interdependent objectives, some of which can potentially conflict with one another. An example of this would be to simultaneously decrease the amount of late demands while also minimizing the amount of unfulfilled demands.

There is a need to provide a method that optimizes objectives based on one or more parameters, in a manner that is efficient and intelligent.

BRIEF SUMMARY

The methods and systems disclosed herein address the problem of the difficulty by planners to select a good configuration among a vast number of possible configurations. The planner might not have the information or resources required to make an educated guess and act on it. In particular, a planner would have to manually input the configuration, which can be prohibitively expensive given that some configurations have hundreds of thousands of parameters. The methods and systems disclosed herein intelligently search through configurations and offers a summary of the best configurations to the planner who can then make an informed choice.

Disclosed herein are methods and systems that provide one or more recommended configurations to planners in an efficient manner. These methods and systems provide optimization of objectives using a genetic algorithm that can provide parameter recommendations that optimize one or more objectives in an efficient and timely manner. The methods and systems disclosed herein are flexible enough to satisfy diverse use cases, while also being fast enough to ensure that planners have quick access to the recommendations, and can thus act promptly.

The systems and methods disclosed herein can apply to any large data set where parameters have to be chosen to initially configure a data set given later to a program (for example, a machine-learning algorithm).

In one aspect, a computer-implemented method for parameter optimization is provided, the method comprising the steps of: defining, by a parameter optimization module, one or more objectives and one or parameters; generating, by the parameter optimization module, an initial set of values of the one or parameters; evaluating, by the parameter optimization module, a fitness function of each objective based on the set of values of the one or parameters; obtaining, by the parameter optimization module, a Pareto Front comprising Pareto objective points, each objective point associated with the fitness function; applying, by the parameter optimization module, a genetic algorithm to the Pareto objective points to generate a new set of objective points; evaluating, by the parameter optimization module, a new Pareto Front based on the new set of objective points; comparing, by the parameter optimization module, a distance between successive Pareto Fronts; and iterating, by the parameter optimization module, through successive Pareto Fronts until the distance is less than a threshold. In some embodiments, when applying the genetic algorithm, the method further comprises calculating, by the parameter optimization module, a plurality of crowding distances of the Pareto objective points; and using, by the parameter optimization module, the plurality of crowding distances to determining pairings of the Pareto objective points. In some embodiments, the method further comprises: grouping, by the parameter optimization module, the one or more parameters as a tree structure, the tree structure comprising one or more node levels; and applying, by the parameter optimization module, the genetic algorithm recursively to each node level of the tree structure.

In another aspect, a system is provided for parameter optimization, the system comprising: a processor; and a memory storing instructions that, when executed by the processor, configure the system to: define, by a parameter optimization module, one or more objectives and one or parameters; generate, by the parameter optimization module, an initial set of values of the one or parameters; evaluate, by the parameter optimization module, a fitness function of each objective based on the set of values of the one or parameters; obtain, by the parameter optimization module, a Pareto Front comprising Pareto objective points, each objective point associated with the fitness function; apply, by the parameter optimization module, a genetic algorithm to the Pareto objective points to generate a new set of objective points; evaluate, by the parameter optimization module, a new Pareto Front based on the new set of objective points; compare, by the parameter optimization module, a distance between successive Pareto Fronts; and iterate, by the parameter optimization module, through successive Pareto Fronts until the distance is less than a threshold. In some embodiments, during application of the genetic algorithm, the system is further configured to: calculate, by the parameter optimization module, a plurality of crowding distances of the Pareto objective points; use, by the parameter optimization module, the plurality of crowding distances to determine pairings of the Pareto objective points. In some embodiments, the system is further configured to: group, by the parameter optimization module, the one or more parameters as a tree structure, the tree structure comprising one or more node levels; and apply, by the parameter optimization module, the genetic algorithm recursively to each node level of the tree structure.

In another aspect, a non-transitory computer-readable storage medium is provided, the computer-readable storage medium including instructions that when executed by a computer, cause the computer to: define, by a parameter optimization module, one or more objectives and one or parameters; generate, by the parameter optimization module, an initial set of values of the one or parameters; evaluate, by the parameter optimization module, a fitness function of each objective based on the set of values of the one or parameters; obtain, by the parameter optimization module, a Pareto Front comprising Pareto objective points, each objective point associated with the fitness function; apply, by the parameter optimization module, a genetic algorithm to the Pareto objective points to generate a new set of objective points; evaluate, by the parameter optimization module, a new Pareto Front based on the new set of objective points; compare, by the parameter optimization module, a distance between successive Pareto Fronts; and iterate, by the parameter optimization module, through successive Pareto Fronts until the distance is less than a threshold. In some embodiments, when applying the genetic algorithm, the computer is further configured to: calculate, by the parameter optimization module, a plurality of crowding distances of the Pareto objective points; and use, by the parameter optimization module, the plurality of crowding distances to determining pairings of the Pareto objective points. In some embodiments, the computer is further configured to: group, by the parameter optimization module, the one or more parameters as a tree structure, the tree structure comprising one or more node levels; and apply, by the parameter optimization module, the genetic algorithm recursively to each node level of the tree structure.

In another aspect, a computer-implemented method is provided for parameter optimization, the method comprising the steps of: defining, by a parameter optimization module, one or more objectives and one or parameters; generating, by the parameter optimization module, a tree structure of the one or parameters, the tree structure comprising a plurality of leaf nodes and one or more node levels; generating, by the parameter optimization module, an initial population of trees; evaluating, by the parameter optimization module, a fitness function of each objective at each leaf node of the plurality of leaf nodes; obtaining, by the parameter optimization module, an initial Pareto Front comprising Pareto objective points, each objective point associated with the fitness function; maintaining, by the parameter optimization module, a second plurality of leaf nodes associated with the initial Pareto Front; applying recursively, by the parameter optimization module, a genetic algorithm to each node level in the tree structure of the leaf nodes that form the initial Pareto Front, until the initial Pareto Front converges to a final Pareto Front. In some embodiments, when applying the genetic algorithm recursively, the method further comprises: calculating, by the parameter optimization module, a plurality of crowding distances of the leaf nodes and a distance of each parent node; and using, by the parameter optimization module, the plurality of crowding distances and the distances of each parent node to determining pairings at each node level. In some embodiments, the genetic algorithm is a Non-dominated Sorting Genetic Algorithm (NSGA-II).

In another aspect, a system comprises: a processor; and a memory storing instructions that, when executed by the processor, configure the system to: define, by a parameter optimization module, one or more objectives and one or parameters; generate, by the parameter optimization module, a tree structure of the one or parameters, the tree structure comprising a plurality of leaf nodes and one or more node levels; generate, by the parameter optimization module, an initial population of trees; evaluate, by the parameter optimization module, a fitness function of each objective at each leaf node of the plurality of leaf nodes; obtain, by the parameter optimization module, an initial Pareto Front comprising Pareto objective points, each objective point associated with the fitness function; maintain, by the parameter optimization module, a second plurality of leaf nodes associated with the initial Pareto Front; apply recursively, by the parameter optimization module, a genetic algorithm to each node level in the tree structure of the leaf nodes that form the initial Pareto Front, until the initial Pareto Front converges to a final Pareto Front. In some embodiments, when the genetic algorithm is applied recursively, the system is further configured to: calculate, by the parameter optimization module, a plurality of crowding distances of the leaf nodes and a distance of each parent node; and use, by the parameter optimization module, the plurality of crowding distances and the distances of each parent node to determining pairings at each node level. In some embodiments, the genetic algorithm is a Non-dominated Sorting Genetic Algorithm (NSGA-II).

In another aspect, a non-transitory computer-readable storage medium is provided, the computer-readable storage medium including instructions that when executed by a computer, cause the computer to: define, by a parameter optimization module, one or more objectives and one or parameters; generate, by the parameter optimization module, a tree structure of the one or parameters, the tree structure comprising a plurality of leaf nodes and one or more node level; generate, by the parameter optimization module, an initial population of trees; evaluate, by the parameter optimization module, a fitness function of each objective at each leaf node of the plurality of leaf nodes; obtain, by the parameter optimization module, an initial Pareto Front comprising Pareto objective points, each objective point associated with the fitness function; maintain, by the parameter optimization module, a second plurality of leaf nodes associated with the initial Pareto Front; apply recursively, by the parameter optimization module, a genetic algorithm to each node level in the tree structure of the leaf nodes that form the initial Pareto Front, until the initial Pareto Front converges to a final Pareto Front. In some embodiments, when applying the genetic algorithm recursively, the computer is further configured to: calculate, by the parameter optimization module, a plurality of crowding distances of the leaf nodes and a distance of each parent node; and use, by the parameter optimization module, the plurality of crowding distances and the distances of each parent node to determining pairings at each node level. In some embodiments, the genetic algorithm is a Non-dominated Sorting Genetic Algorithm (NSGA-II).

The details of one or more embodiments of the subject matter of this specification are set forth in the accompanying drawings and the description below. Other features, aspects, and advantages of the subject matter will become apparent from the description, the drawings, and the claims.

Like reference numbers and designations in the various drawings indicate like elements.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
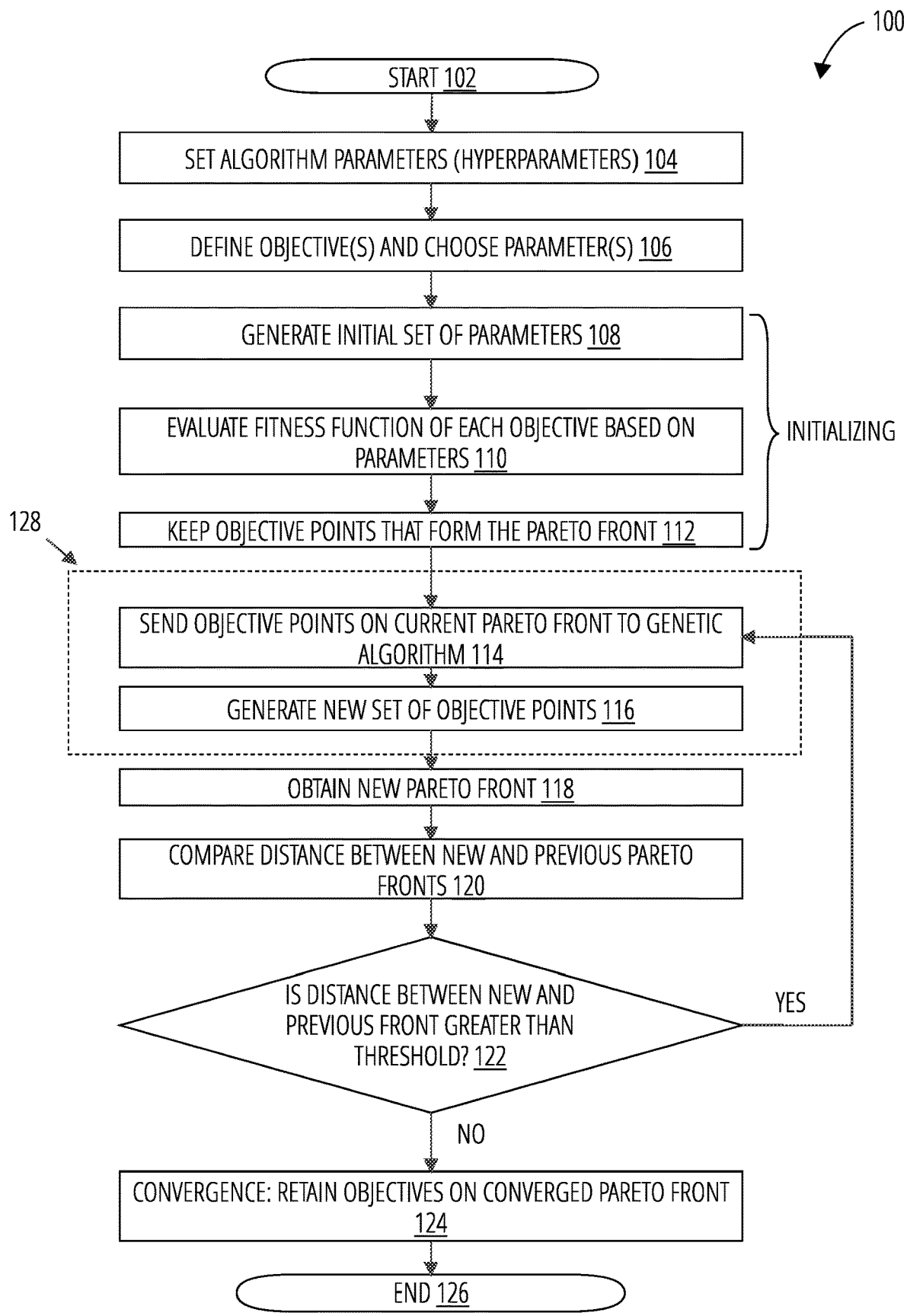
FIG. 1 illustrates a flow chart in accordance with one embodiment.

FIG. 1 illustrates a flow chart 100 in accordance with one embodiment.

Hyperparameters are set at step 104. The hyperparameters can include algorithmic parameters that are used in the iterative process and the genetic algorithm. In some embodiments, the hyperparameters include:

Cross over probability (0-1.0): The probability of two individuals mating when they are paired together;

Mutation probability (0-1.0): The probability that an individual is mutated. We typically set this to 100%;

Diversity modification higher bound (0-1.0): The most an individual can be modified if it is crowded next to an individual;

Diversity modification lower bound (0-1.0): the least an individual can be modified if it is crowded next to an individual. These two numbers define a function which the crowding distance is mapped to a mutation strength;

Number of trees: The number of initial guesses to make and number of individuals that should be in the Pareto Front;

Retry Rate: The amount of times to retry generating new individuals when the L1 distance is under the threshold before determining that convergence of a pareto front has occurred; and Distance Threshold: The distance that is used as a minimum threshold to determine if a Pareto Front has converged.

At step 106, a user can define one or more objectives and choose one or more parameters that evaluate each of the objectives.

At step 108, an initial set of parameters is generated. This initial set can be generated randomly, using techniques known in the art. The initialization of the parameters is equivalent to setting an initial configuration of the data set. The number of initial guesses is set in the list of hyperparameters; this number is equivalent to the number of trees.

Each objective is evaluated by a fitness function at step 110. The argument of each fitness function are the parameters. For example, F1 (p1, p2, . . . , pN) is the fitness function of objective '1' whose value depends on 'N' parameters {p1, p2, . . . pN}. F1 is evaluated for each initial guess of the parameters {p1, p2, . . . pN}. The same evaluation is performed for each of the remaining fitness functions. For example, if there are 'M' objectives, there will be 'M' fitness functions [F1, F2, . . . FM], with each fitness function evaluated at each of the initial guesses of the parameters. For example, for the first initial guess of the parameters $\{p1^{(1)}, p2^{(1)}, \ldots, pN^{(1)}\}$ there is a an "objective point" defined as the set of each fitness function evaluated at this initial guess: $[F1^{(1)}, F2^{(1)}, \ldots, FN^{(1)}]$. A plurality of initial objective points is generated, based on the plurality of initial guesses of the parameters.

Figure 2:
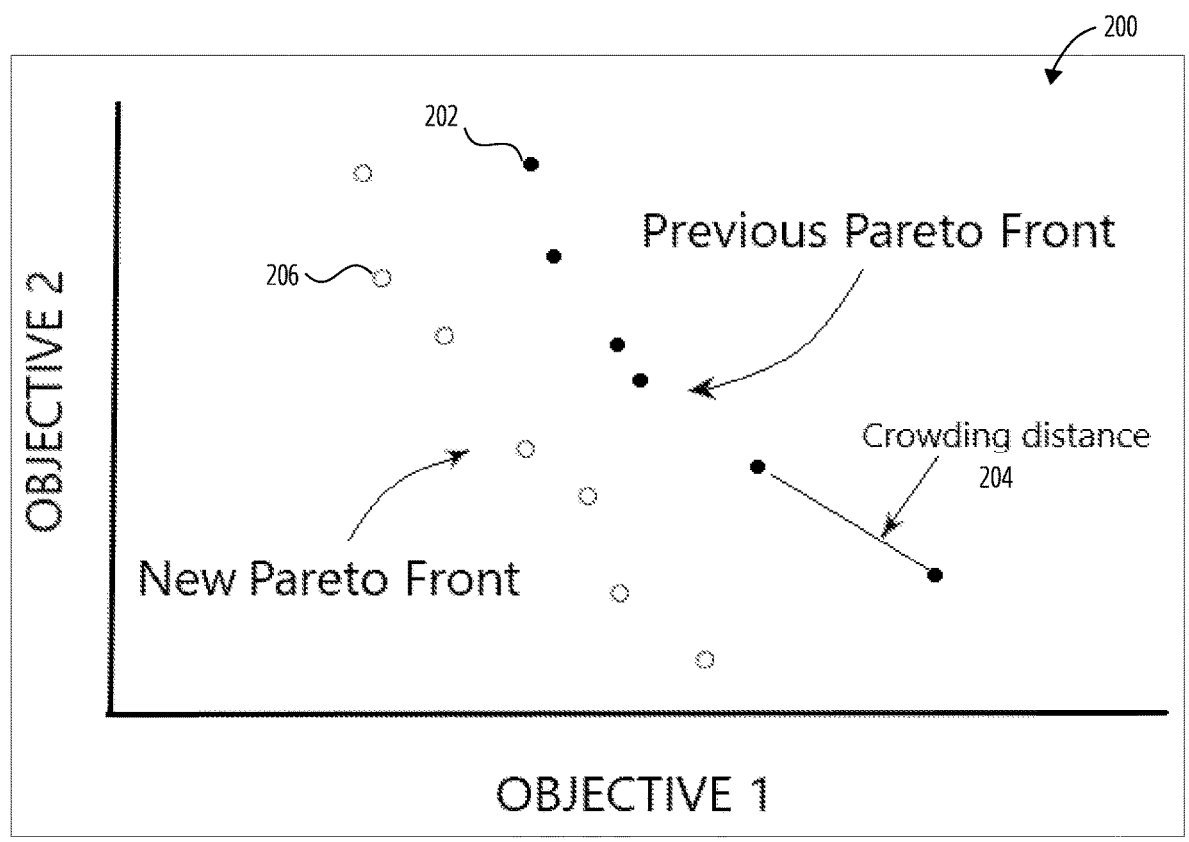
FIG. 2 illustrates a representation of successive Pareto Fronts in accordance with one embodiment.

At step 112, techniques known in the art are used to retain those objective points that form a Pareto Front. That is, the objective points that are retained, are non-dominated by other objective points. Those objective points that are dominated by one or more other objective points, are pruned (or discarded). The retained objective points are also referred to as the "Pareto Front". An illustration of Pareto Fronts is shown in FIG. 2.

At step 114, the objective points (and their associated parameters) are sent to a genetic algorithm to generate a new set of objective points at step 116. In addition, one or more hyperparameters may be sent to the genetic algorithm as required. The combined steps can form genetic algorithm subroutine 128 that allows for variations in the way the genetic algorithm generates a new set of objective points. This genetic algorithm subroutine 128 is further discussed in FIG. 3.

Non-limiting examples of genetic algorithms that may be used in the systems and methods for parameter optimization include: Strength Pareto Evolutionary Algorithm (SPEA2), Pareto Envelope Selection Algorithm (PESA), Pareto Archived Evolution Strategy (PAES), Niched Pareto Genetic Algorithm (NPGA), and Non-dominated Sorting Genetic Algorithm (NSGA-II).

Many of these genetic algorithms differ in their selection operator (how parings are determined) and pruning mechanisms (how Pareto Front points are selected). Non-limiting examples of Mating Operators include: Uniform Partially Matched (used primarily for permutations); Simulated Binary Bounded (used primarily for decimal values); and Uniform Crossover (used primarily for binary values). Non-limiting examples of Mutation Operators include: Shuffle Indexes (primarily for permutations); Polynomial Bounded Mutation (primarily for decimal values); and Binary Bit Flip Mutation (primarily for binary values).

At step 118, pruning takes place to provide a new Pareto Front. That is, the new set of objective points are pruned so as to retain only those objective points that are non-dominated.

At step 120, the distance (L1) between the new Pareto Front and the previous Pareto Front is evaluated, by techniques known in the art.

At decision block 122, the distance (L1) is compared to a threshold value set in the hyperparameters at step 104. If the distance is greater than the threshold, then step 114, step 118 and step 120 are repeated until convergence of the Pareto Front occurs at step 124. The objective points on the converged Pareto Front are retained, and the associated parameters for each objective point, provide a configuration for the user. These objective points serve as recommendations for the user, which is shown in the Example below. The program ends at step 126.

FIG. 2 illustrates a representation 200 of successive Pareto Fronts in accordance with one embodiment. In the example of FIG. 2, there are two objectives. The filled circles 202 represent a previous Pareto Front generated at step 112 of FIG. 1. An example of a crowding distance 204, defined as the distance between two objective points on a Pareto Front, is shown in FIG. 2. The hollow circles 206 represent a new Pareto Front, obtained at step 118 of FIG. 1. The distance between the previous and new Pareto Fronts can be calculated by techniques know in the art. If this distance is less than a threshold hyperparameter, then the generation of new pareto fronts ceases (step 124 of FIG. 1).

Figure 3:
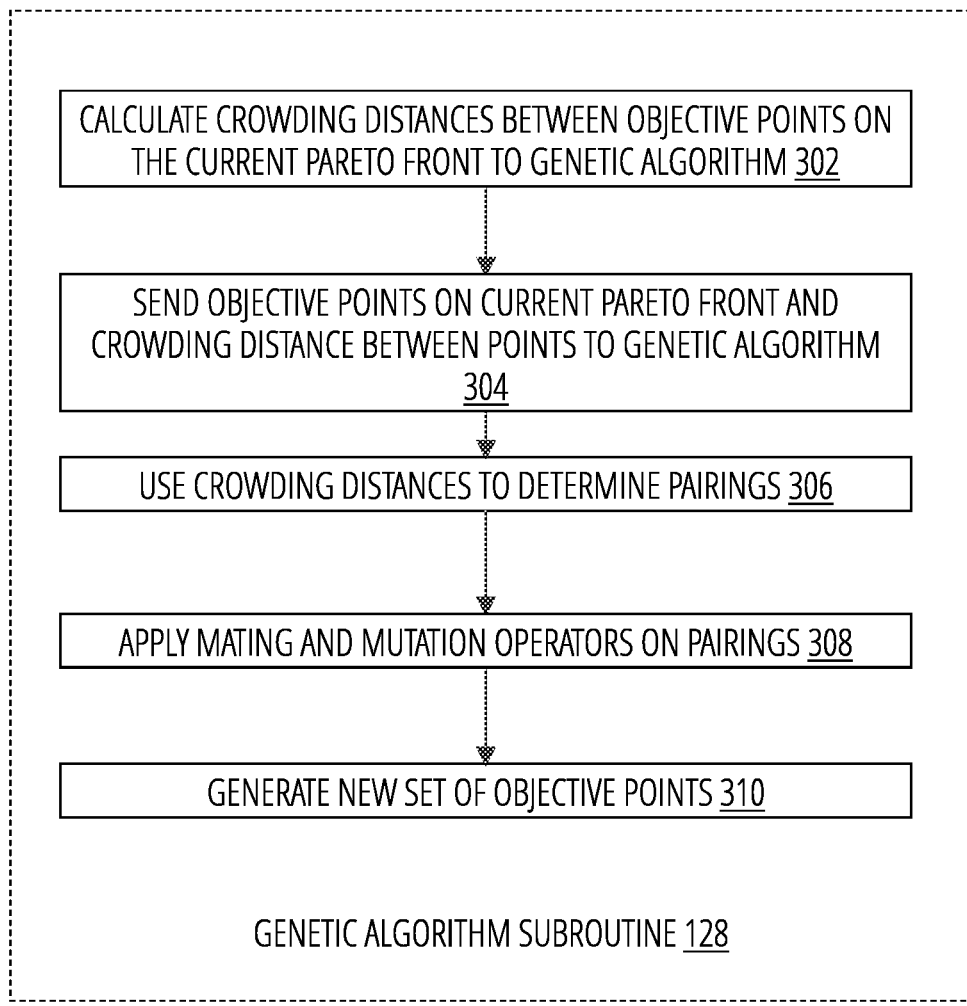
FIG. 3 illustrates a subroutine for generating new objective points in accordance with one embodiment.

FIG. 3 illustrates a genetic algorithm subroutine 128 for generating new objective points in accordance with one embodiment. At step 302, crowding distances between objective points on the Pareto Front are calculated (see 204 in FIG. 2 for an illustration of a crowding distance). A genetic algorithm receives the set of objective points on the current Pareto Front, along with the crowding distances of each objective point, at step 304. At step 306, the genetic algorithm uses the crowding distances to determine which objective points will pair for further manipulation. It then applies mating and mutation operators on the pairings at step 308 and generates a new set of objective points at step 310.

Examples of genetic algorithms include Non-dominated Sorting Genetic Algorithm (NSGA)-II.

Figure 4:
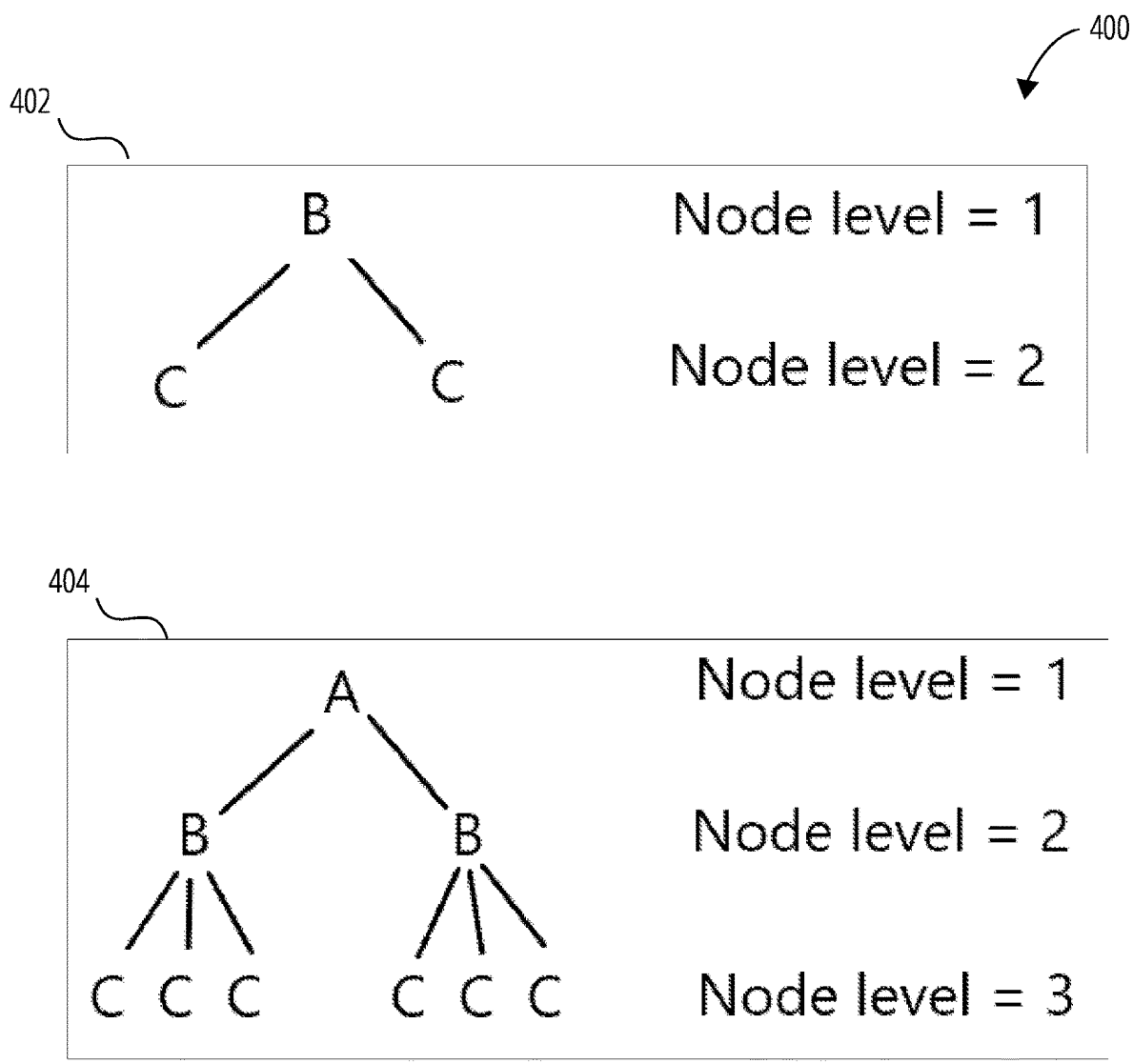
FIG. 4 illustrates examples of parameter tree structures in accordance with one embodiment.

When the number of parameters is greater than 1, a tree structure of the parameters can be used to enhance the method shown in FIG. 1. FIG. 4 illustrates examples 400 of parameter tree structures in accordance with one embodiment.

The node with the lowest-level node (node level=1) is called the root node; nodes with the highest-level node (node level=number of parameters) are called leaf nodes. Note that if there is only one parameter, the tree structure has only one node level.

As an example, suppose there are two parameters {P1, P2}. Initial guesses of these parameters can be put into a tree structure, as shown in two-parameter tree structure 402. Here, P1=B and P2=C. There are two levels of nodes in this tree structure, with B occupying a node level of 1, and C occupying a node level of 2. The C-level nodes are referred to as "leaf nodes", since the tree structure ends at C. The B-level node is a parent node of the C-level node, and is also the root node.

Suppose there are three initial random guesses for B={1, 2, 3} and two initial random guesses for C={5, 6}. That is, there are 6 initial pairs of random guesses {B, C}. These can be put into a tree structure, where B has a common value for each value of C. As an example, the two-parameter tree structure 402 can represent the pairs {B=1, C=5} and {B=1, C=6}. There are a total of three tree structures that represent all of the initial guesses: {B=1; C=5 and C=6}, {B=2; C=5 and C=6}, and {B=3; C=5 and C=6}.

Three-parameter tree structure 404 provides an example of three parameters {P1, P2, P3}. Initial guesses of these parameters can be put into a tree structure. Here, P1=A, P2=B and P3=C. There are three levels of nodes, with A occupying a node level of 1, B occupying a node level of 2 and C occupying a node level of 3. The C-level nodes are referred to as "leaf nodes", since the tree structure ends at C. The B-level node is a parent node of the C-level node, and the A-level node is a parent of the B-level node. The A-level node is also the root node for this tree structure. For any given C-node, its parent nodes B and A are called its lineage.

Suppose there are 2 initial random guesses for A={2, 3}, two initial random guesses for B={1, 2} and three initial random guesses for C={5, 6, 7}. That is, there are 12 initial triplets of random guesses {A, B, C}. These can be put into a tree structure as follows: set A={2}. The six triplets for the tree structure are {A=2, B=1, C=5}; {A=2, B=1, C=6}; {A=2, B=1, C=7}; {A=2, B=2, C=5}; {A=2, B=2, C=6} and {A=2, B=2, C=7}. There are a total of two tree structures that represent all of the initial triplet guesses.

While specific examples of tree structures are shown in FIG. 4, parameter tree structures can take on any number of children at any node level.

Figure 5:
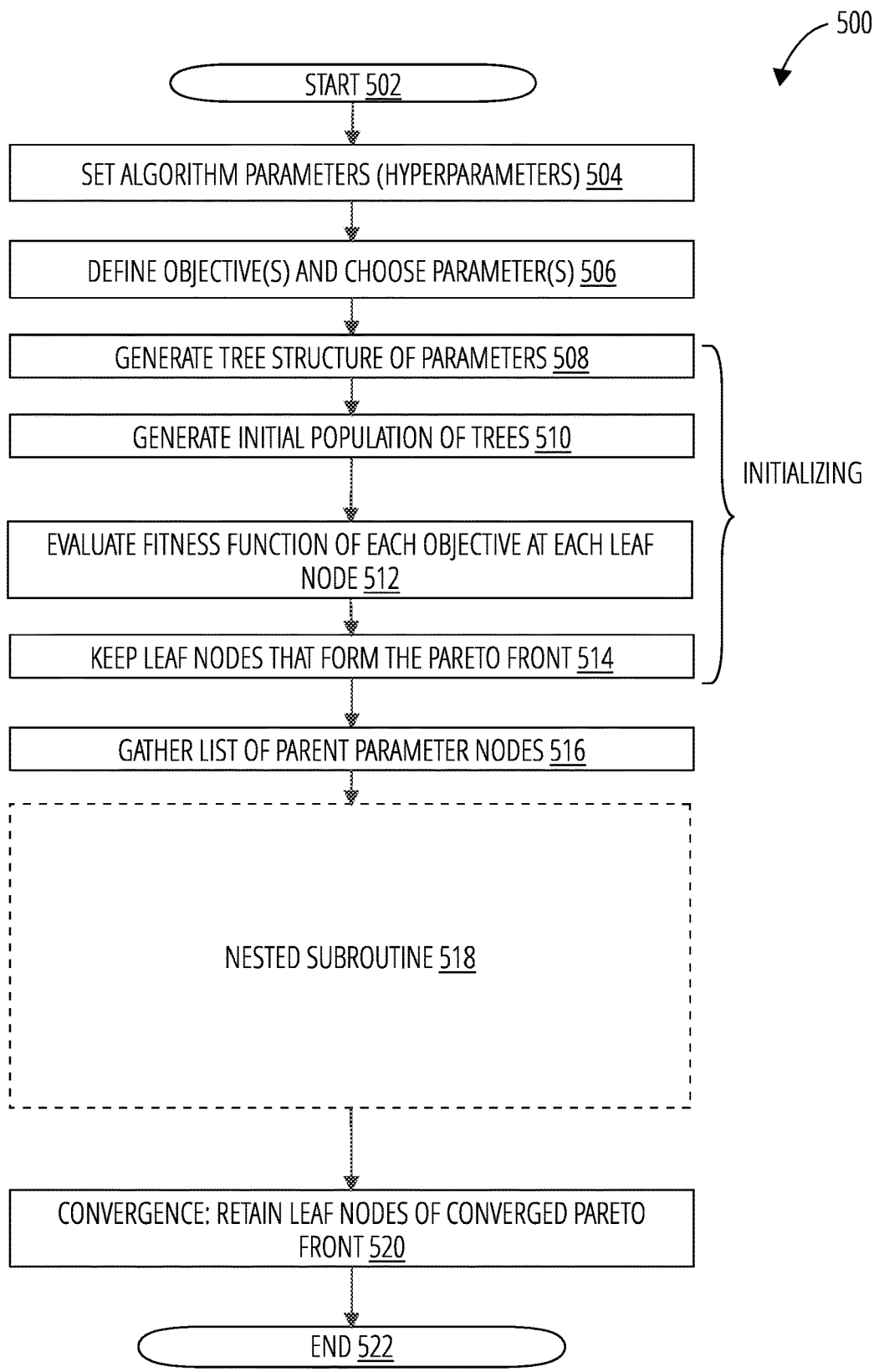
FIG. 5 illustrates a flow chart in accordance with one embodiment.

FIG. 5 illustrates a flow chart 500 in accordance with one embodiment, that is variation of the flow chart 100 shown in FIG. 1, in which a parameter tree structures are used to find the final Pareto Front.

As in FIG. 1, hyperparameters are set at step 504 and at step 506, a user can define one or more objectives and choose one or more parameters that evaluate each of the objectives. The parameters are grouped as a tree structure at step 508, with the number of node levels in the tree equal to the number of parameters. Recall from the description of FIG. 4 above that the node with the lowest-level node number (NL=1) is the root node; nodes at the highest-level node number (NL=number of parameters) are the leaf nodes.

At step 510, an initial population of trees generated. This initial set can be generated randomly, using techniques known in the art. The initialization of the parameters is equivalent to setting an initial configuration of the data set. The number of initial guesses is set in the list of hyperparameters; this number is equivalent to the number of trees.

At step 512, the fitness function of each objective at each leaf node is evaluated, while at step 514, techniques known in the art are used to retain those leaf nodes that form a Pareto Front. That is, the leaf nodes that are retained, are non-dominated by other leaf nodes. Those leaf nodes that are dominated by one or more other leaf nodes, are pruned (or discarded). The retained leaf nodes form the Pareto Front.

At step 516, for each leaf node in the parent front (at step 514), a list of parameter nodes is gathered. This information is provided to set of nested subroutines at step 518 that exploit the parameter tree structure to arrive at a converged Pareto Front. The leaf nodes of the converged Pareto Front are retained at step 520 and provide a list of recommended solutions. The nested subroutines comprise a leaf-solver subroutine and a parent-node solver subroutine. These are discussed below. The program ends at step 522.

Figure 6:
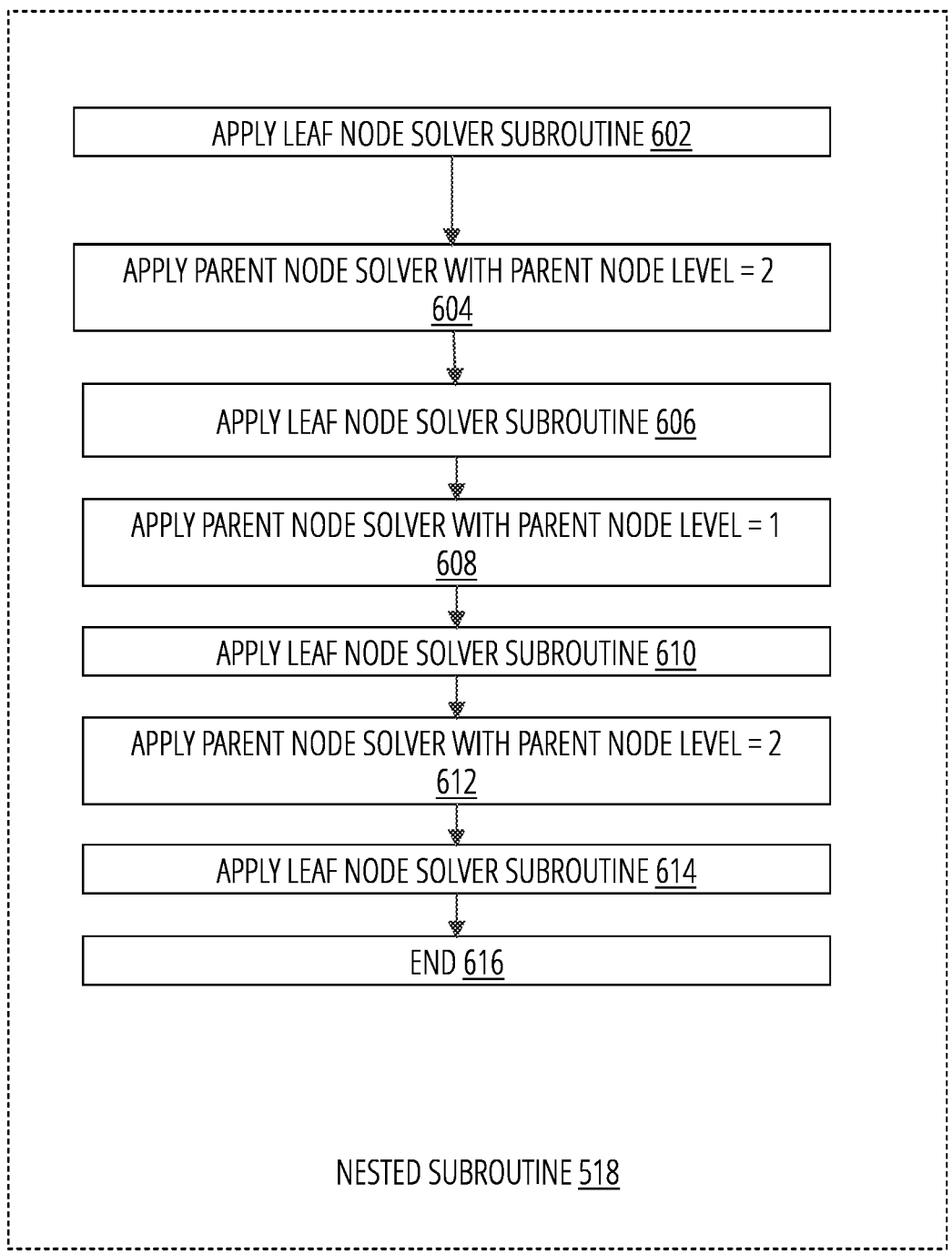
FIG. 6 illustrates a flow chart of a nested subroutine in accordance with one embodiment.

FIG. 6 illustrates a flow chart of nested subroutines in accordance with one embodiment where there are three parameters. At step 602, the leaf-solver subroutine is applied to the current Pareto Front generated at step 514 in FIG. 5 to provide a converged Pareto Front, which is then input to the parent node solver subroutine at step 604.

At step 604, the parent node level is set at 2. With reference to the three-parameter tree structure 404 (in FIG. 4), the parent node solver is applied to parent parameters designated by 'B'. The parent node solver subroutine ultimately provides a new Pareto Front based on a new set of leaf nodes that are generated by a new set of parent 'B' nodes.

The leaf node solver subroutine is applied once again at step 606 to provide a newly converged Pareto Front. At step 608, parent node solver subroutine is applied to the converged Pareto Front that is input. However, this time, the parent node level is set to 1. With reference to the three-parameter tree structure 404 (in FIG. 4), the parent node solver is now applied to parent parameters designated by 'A', thereby generating a new set of 'A' nodes, and ensuing new set of 'B' nodes and 'C' nodes (i.e. Leaf nodes).

The leaf node solver is applied again at step 610 for the new leaf nodes, which generates a newly-converged Pareto Front, followed by re-application of the parent node solver at step 612, in which the 'B' parent nodes are used to generate a new set of 'C' (i.e. leaf) nodes. The leaf node solver is applied one last time at step 614, after which a converged Pareto front is obtained. The program ends at step 616.

A description of each of the leaf node solver subroutine and the parent node solver subroutine are provided below.

Figure 7:
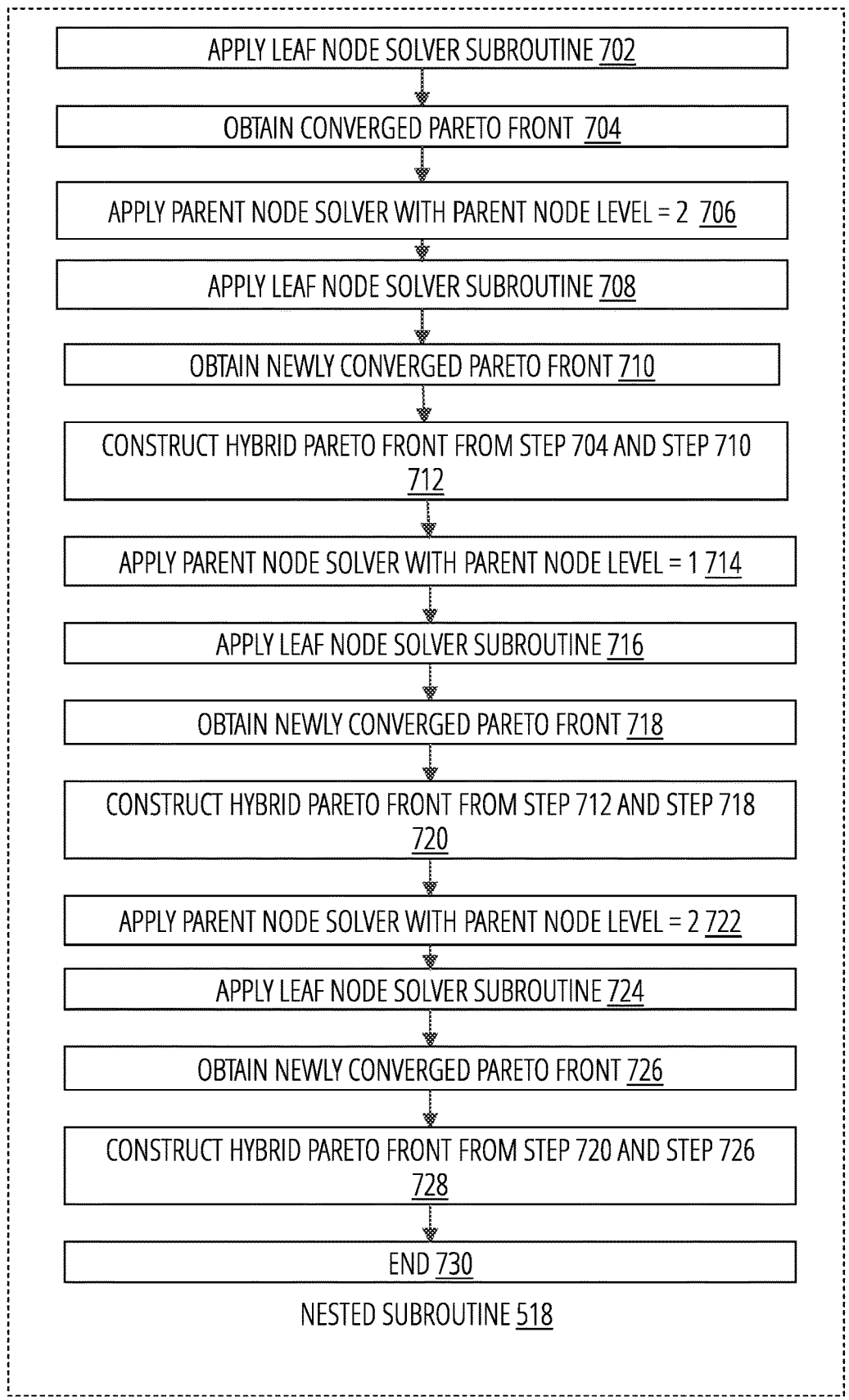
FIG. 7 illustrates a flow chart of a nested subroutine in accordance with one embodiment.

FIG. 7 illustrates a flow chart of nested subroutines in accordance with one embodiment where there are three parameters. FIG. 7 is similar to the nested subroutine described in FIG. 6, except that a series of hybrid converged Pareto Fronts are constructed.

At step 702, the leaf-solver subroutine is applied to the current Pareto Front generated at step 514 in FIG. 5 to provide a converged Pareto Front at step 704, which is then input to the parent node solver subroutine at step 706.

At step 706, the parent node level is set at 2. With reference to the three-parameter tree structure 404 (in FIG. 4), the parent node solver is applied to parent parameters designated by 'B'. The parent node solver subroutine ultimately provides a new Pareto Front based on a new set of leaf nodes that are generated by a new set of parent B' nodes.

The leaf node solver subroutine is applied once again at step 708 to provide a newly converged Pareto Front at step 710, which is compared to the previously converged Pareto Front obtained at step 704. At step 712, a hybrid-converged Pareto Front is constructed from the two converged Pareto fronts, which is then used as input at step 714.

At step 714, parent node solver subroutine is applied to the converged Pareto Front that is input. However, this time, the parent node level is set to 1. With reference to the three-parameter tree structure 404 (in FIG. 4), the parent node solver is now applied to parent parameters designated by 'A', thereby generating a new set of 'A' nodes, and ensuing new set of B' nodes and 'C' nodes (i.e. Leaf nodes).

The leaf node solver is applied again at step 716 for the new leaf nodes, which generates a newly-converged Pareto Front at step 718. This newly converged Pareto Front obtained at step 718 is compared to the hybrid Pareto Front obtained at step 712, and a new hybrid Pareto Front is constructed at step 720 from these two Pareto Fronts.

At step 722, the hybrid Pareto Front (obtained at step 720) is input to parent node solver, in which the B' parent nodes are used to generate a new set of 'C' (i.e. leaf) nodes. The leaf node solver is applied one last time at step 724, after which a newly converged Pareto front is obtained at step 726. A final hybrid Pareto Front is constructed at step 728 from the converged Pareto Front obtained at step 726 and the hybrid Pareto Front at step 720. The program ends at step 730.

A description of each of the leaf node solver subroutine and the parent node solver subroutine are provided below.

Figure 8:
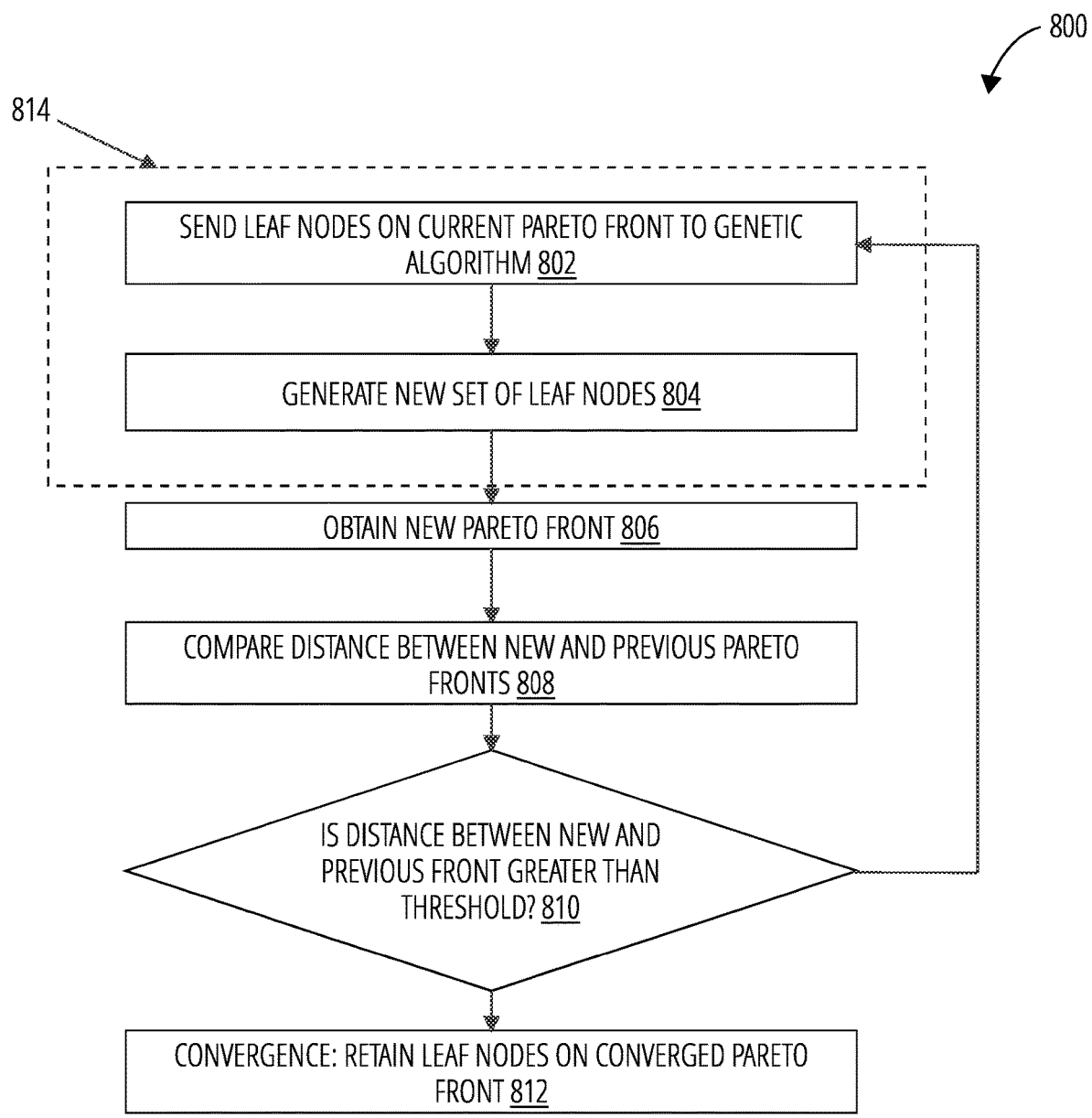
FIG. 8 illustrates a leaf-solver subroutine in accordance with one embodiment.

FIG. 8 illustrates a leaf-solver subroutine 800 in accordance with one embodiment. This subroutine roughly corresponds to step 114 to step 124 in FIG. 1.

At step 802, the leaf nodes on the current Pareto Front are sent to the genetic algorithm to generate a new set of leaf nodes at step 804, which are then pruned to provide a new Pareto Front at step 806. The distance between the new and previous Pareto fronts are compared at step 808. If this distance is less than a threshold value (set in the hyperparameters), the Pareto Front is deemed to have converged. If not, then step 802-decision block 810 are repeated until convergence is obtained, at which point the leaf nodes on the converged Pareto Front are retained at step 812.

Figure 9:
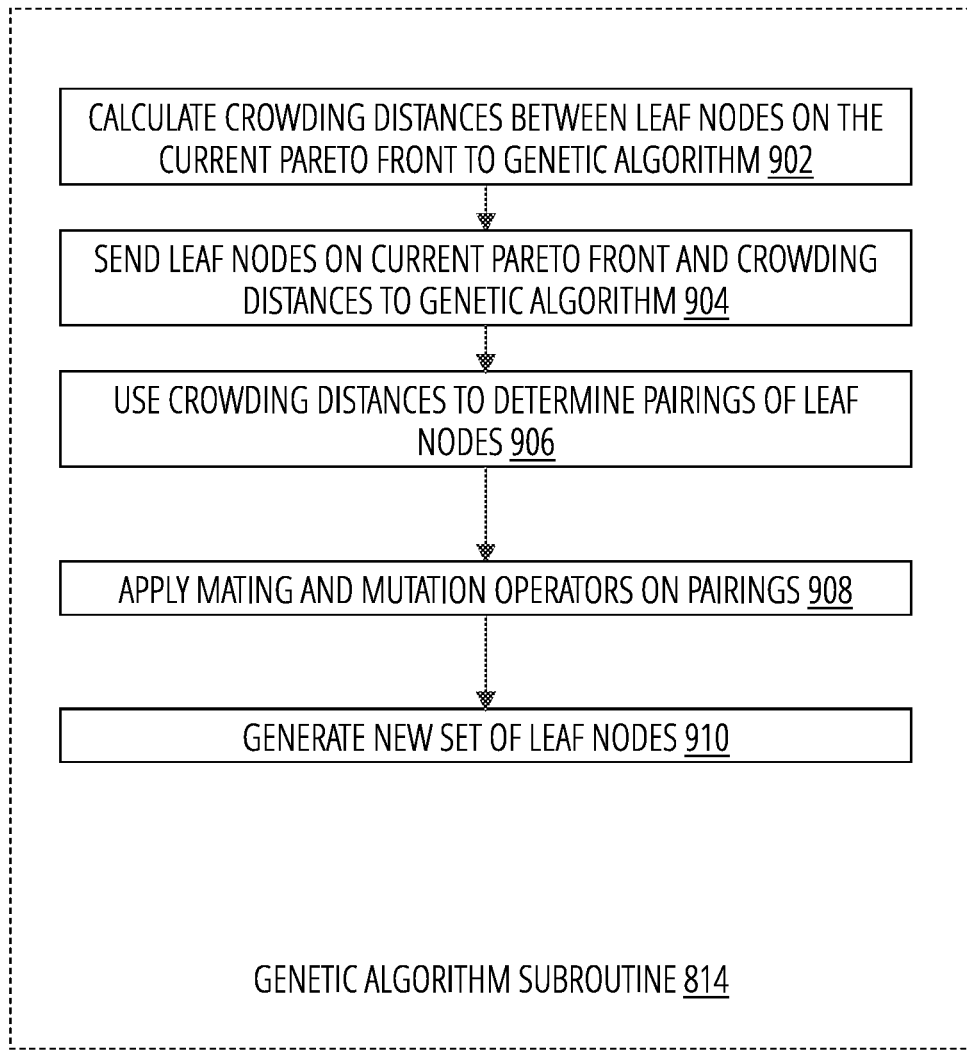
FIG. 9 illustrates a subroutine for generating new objective points in accordance with one embodiment.

Genetic algorithm subroutine 814 of the leaf node solver subroutine is discussed further with reference to FIG. 9.

FIG. 9 illustrates a genetic algorithm subroutine 814 for generating new leaf nodes accordance with one embodiment. At step 902, crowding distances between leaf nodes s on the Pareto Front are calculated (see 204 in FIG. 2 for an illustration of a crowding distance). A genetic algorithm receives the set of leaf nodes on the current Pareto Front, along with the crowding distances of each leaf node, at step 904. At step 906, the genetic algorithm uses the crowding distances to determine which objective points leaf nodes will pair for further manipulation. It then applies mating and mutation operators on the pairings at step 908 and generates a new set of leaf nodes at step 910. In some embodiments, only leaf nodes with the same lineage are eligible for mating with each other.

Examples of genetic algorithms include Non-dominated Sorting Genetic Algorithm (NSGA)-II.

Figure 10:
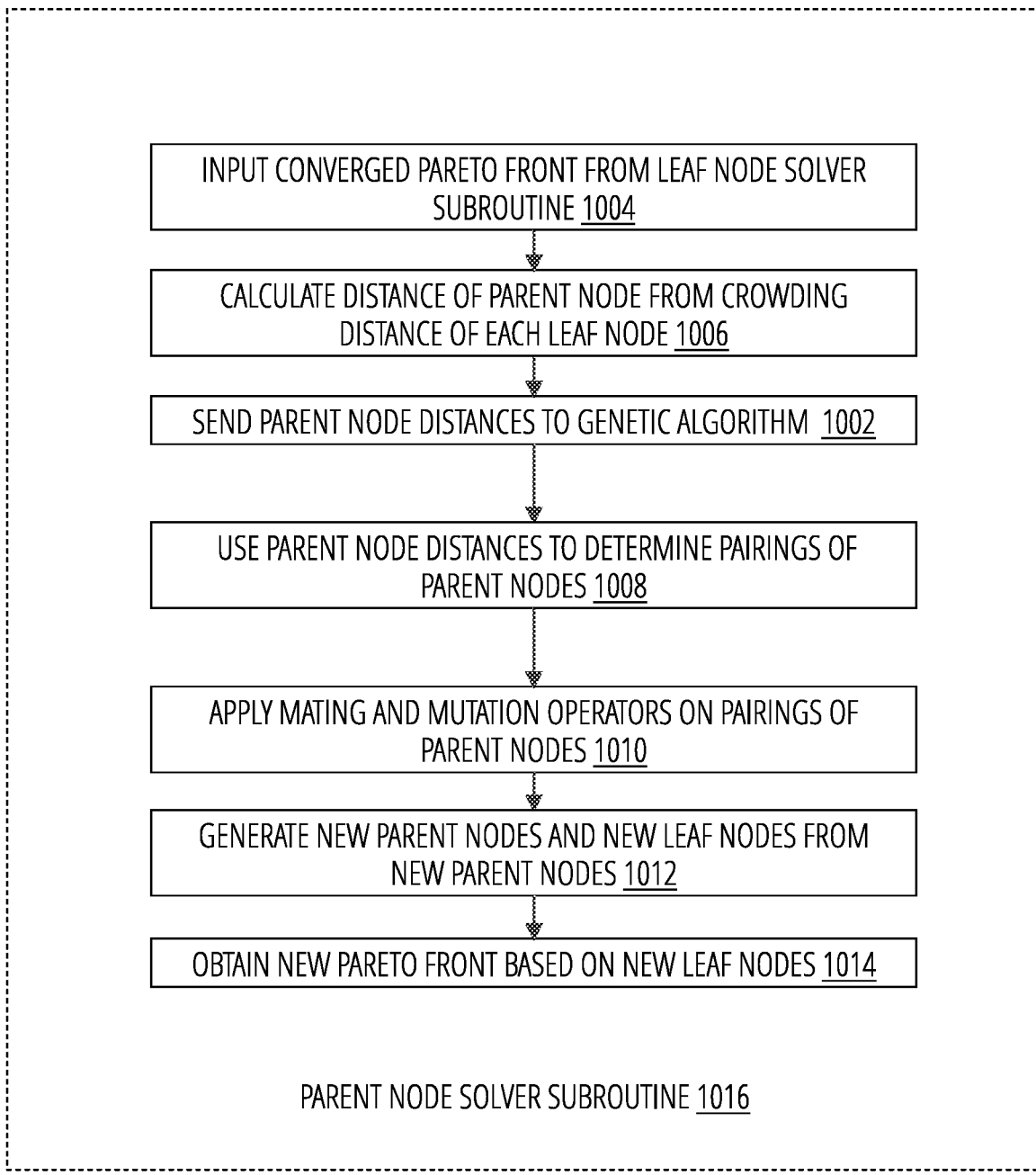
FIG. 10 illustrates a parent node solver subroutine in accordance with one embodiment.

FIG. 10 illustrates a parent node solver subroutine 1016 in accordance with one embodiment. At step 1004, parent node solver subroutine 1016 receives as input, the converged Pareto Front from leaf node solver subroutine (see FIG. 8).

At step 1006, the crowding distance of each leaf node is used to determine a distance of each parent node. In some embodiments, an average crowding distance is used to determine a distance of each parent node.

At step 1002, the parent node distances are sent to the genetic algorithm which uses this information to determine suitable pairings of the parent nodes at step 1008. The genetic algorithm then applies mating and mutation operators on the suitable pairings of parent nodes at step 1010. This generates a new set of parent nodes at step 1012, which in turn generates a new set of leaf nodes. The new leaf nodes are pruned such that a new Pareto Front is obtained at step 1014.

The parent node solver subroutine 1016 is used to generate a new set of parent nodes for any node level except the leaf node level. These new parent nodes, in turn, generate new leaf nodes, and a new Pareto Front.

Figure 11:
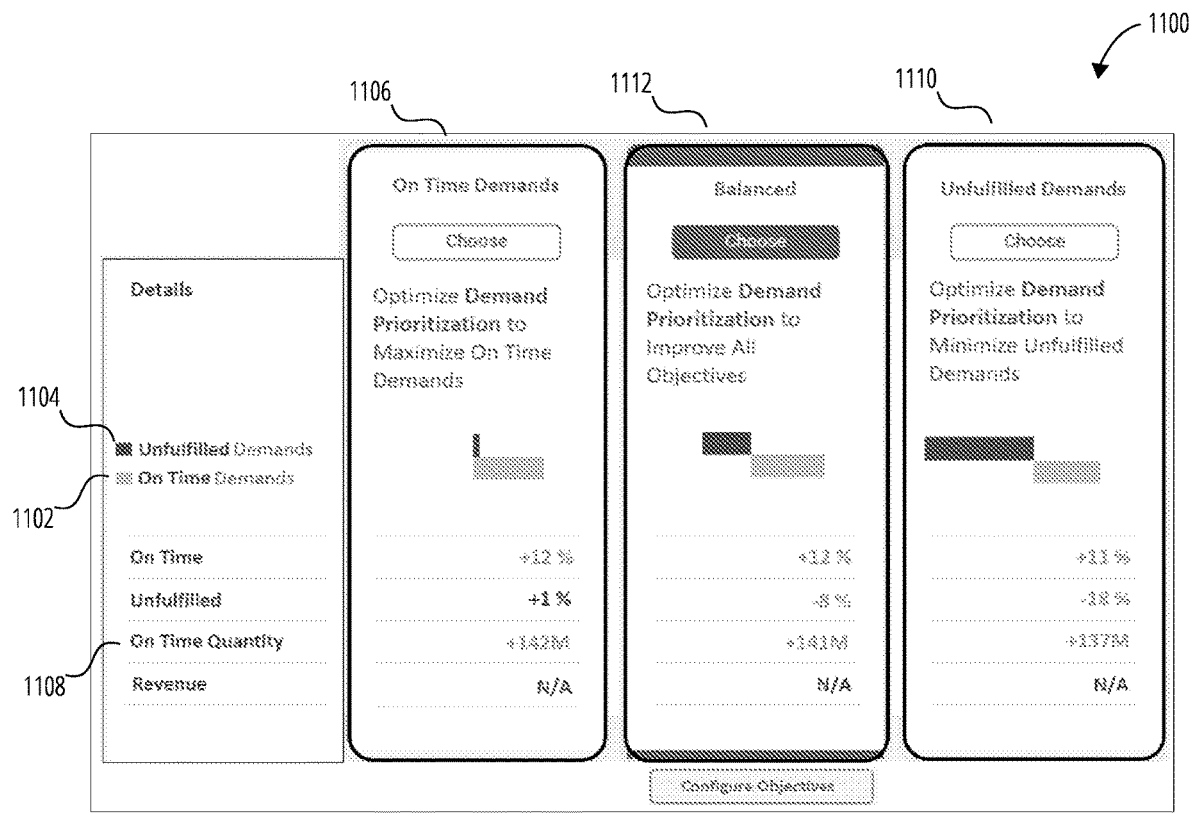
FIG. 11 illustrates recommended configurations in a supply chain in accordance with one embodiment.

FIG. 11 illustrates recommended configurations 1100 in a supply chain in accordance with one embodiment.

In FIG. 11, there are two objectives. Namely, to increase on-time demands 1102 while decreasing unfulfilled demands 1104. The parameter used to evaluate each objective is the demand prioritization, which is the same as a transaction sequence discussed above. The genetic algorithm used was NSGA-II for selection, while Uniform Partially Matched used for the mating operator and Shuffle Indexes used for the mutation operator.

The supply chain analyzed in FIG. 11 contains in excess of 70,000 different demands across the entire supply chain, resulting in 70,000 factorial possible different transaction sequences. The system and method generate three recommendations—one which maximizes on-time demands 1102; one which minimizes unfulfilled demands 1104, while the third provides a balanced recommendation between both objectives. These are all evaluated according to business needs. While the results shown in FIG. 11 weigh each objective equally during the calculation, the systems and methods can weigh each objective in terms of its individual importance.

In recommendation 1106, the on-time demands 1102 is maximized through an optimization of the demand prioritization. In this recommended scenario, the optimized parameter increases the on-time demands 1102 by 12% prior to application of the algorithm. In this example, the base value of on-time demands 1102 is 19,523 demands. However, the drawback is that these same optimized parameters increase the unfulfilled demands 1104 by 1%, compared to pre-parameter optimization. In this example, the base value of unfulfilled demands 1104 is 102 demands. Overall though, the on-time quantity 1108, defined as the amount of units delivered on time to their destination, increases by 142M units.

In recommendation 1110, the unfulfilled demands 1104 is maximized through an optimization of the demand prioritization. In this recommended scenario, the optimized parameters decrease the unfulfilled demands 1104 by 18%—which is a far better situation for this objective than in recommendation 1106. Furthermore, in this scenario, the on-time demands 1102 increase by 11%, slightly less than the 12% increase shown in recommendation 1106. Here, the on-time quantity 1108 increases by 137M units, which is not as high as the 142M unit increase shown in recommendation 1106.

Finally, in recommendation 1112, the demand prioritization is optimized by finding a balance between the on-time demands 1102 and the unfulfilled demands 1104—rather than trying to prioritize one over the other. In this recommended scenario, the optimized parameters decrease the unfulfilled demands 1104 by 8%—which is a far better situation for this objective than in recommendation 1106, but less so than recommendation 1110. Furthermore, in this scenario, the on-time demands 1102 increase by 12%, equal to the increase shown in recommendation 1106, and slightly better than the 11% increase shown in recommendation 1110. Here, the on-time quantity 1108 increases by 141M units, which is slightly less than the 142M unit increase shown in recommendation 1106, but higher than the 137M unit increase of recommendation 1110.

Once the recommendations are provided to the planner, s/he is free to choose one. For example, a planner may opt to choose recommendation 1110, if the main goal is to minimize the unfulfilled demands 1104—even though its on-time quantity goes up by 137M units, which is less than that of other recommendations. Or, the planner may choose recommendation 1112, since the balanced approach provides for on-time demands 1102 and unfulfilled demands 1104 that are acceptable, while providing an on-time quantity 1108 increase of 141M units.

In general, the number of recommendations is set at the outset of the method. It is possible that the final number of recommendations obtained may be less than the number of recommendations set at the outset. In the case of the example shown in FIG. 11, eight recommendations were set for the analysis. While eight recommendations were obtained, only three are shown.

The recommendations shown, were all based on an excess of 70,000 demands over three years of an international supply chain. The processing time to arrive at the three different scenarios was only 40 minutes. It is impossible for a modern computer to find a single solution out of the massive number of $10^{100\,000}$ different parameter configurations in the conventional approach, as it would take longer than the age of the universe to compute. The systems and methods disclosed herein provide recommended configurations quickly and efficiently, and allow our planners to act promptly on these recommendations.

Figure 12:
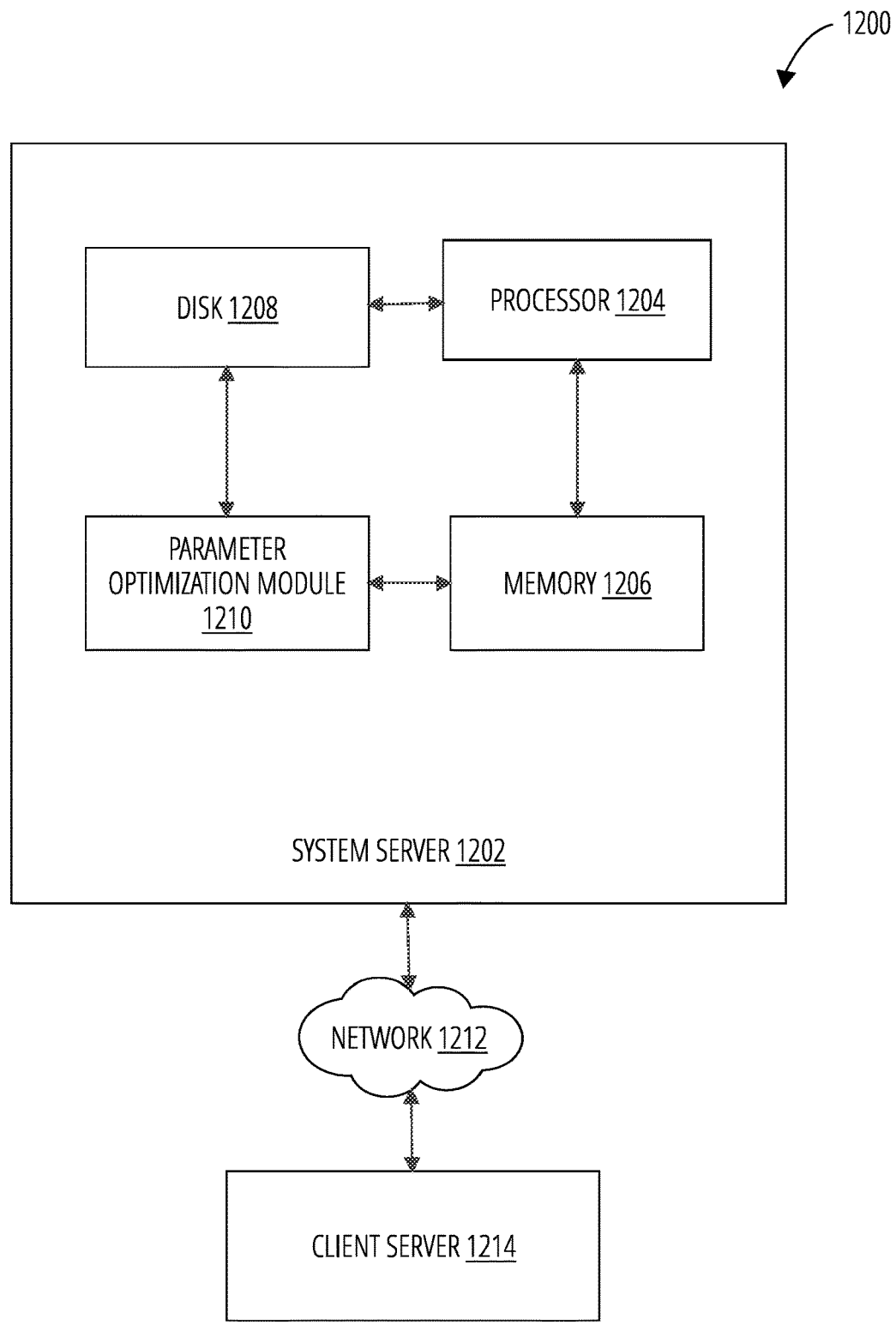
FIG. 12 illustrates a block diagram of a system in accordance with one embodiment.

FIG. 12 illustrates a block diagram of system 1200 in accordance with one embodiment.

System 1200 includes a system server 1202 and client server 1214. System server 1202 can include a memory 1206, a disk 1208, a processor 1204 and a parameter optimization module 1210. While one processor 1204 is shown, the system server 1202 can comprise one or more processors. In some embodiments, memory 1206 can be volatile memory, compared with disk 1208 which can be non-volatile memory. In some embodiments, system server 1202 can communicate with client server 1214 via network 1212.

System 1200 can also include additional features and/or functionality. For example, system 1200 can also include additional storage (removable and/or non-removable) including, but not limited to, magnetic or optical disks or tape. Such additional storage is illustrated in FIG. 12 by memory 1206 and disk 1208. Storage media can include volatile and nonvolatile, removable and non-removable media implemented in any method or technology for storage of information such as computer-readable instructions, data structures, program modules or other data. Memory 1206 and disk 1208 are examples of non-transitory computer-readable storage media. Non-transitory computer-readable media also includes, but is not limited to, Random Access Memory (RAM), Read-Only Memory (ROM), Electrically Erasable Programmable Read-Only Memory (EEPROM), flash memory and/or other memory technology, Compact Disc Read-Only Memory (CD-ROM), digital versatile discs (DVD), and/or other optical storage, magnetic cassettes, magnetic tape, magnetic disk storage or other magnetic storage devices, and/or any other medium which can be used to store the desired information and which can be accessed by system 200. Any such non-transitory computer-readable storage media can be part of system 1200.

Communication between system server 1202 and client server 1214 via network 1212 can be over various network types. Non-limiting example network types can include Fibre Channel, small computer system interface (SCSI), Bluetooth, Ethernet, Infrared Data Association (IrDA), Local area networks (LAN), Wireless Local area networks (WLAN), wide area networks (WAN) such as the Internet, serial, and universal serial bus (USB). Generally, communication between various components of system 200 may take place over hard-wired, cellular, Wi-Fi or Bluetooth networked components or the like. In some embodiments, one or more electronic devices of system 200 may include cloud-based features, such as cloud-based memory storage.

Client server 1214 can provide a variety of raw data from the user for use by the parameter optimization module 1210. In addition, the objectives may be computed at client server 1214. In some embodiments, the raw data includes, but is not limited to: point of sales data that indicates the sales record of all of the client's products at every location; the inventory history of all of the client's products at every location; promotional campaign details for all products at all locations, and events that are important/relevant for sales of a client's product at every location.

Parameter optimization module 1210 includes all of the resource where the operations (e.g. (initialization, mutation, mating, etc.) of the various routines and subroutines occur. The genetic algorithms and associated operators are also stored within the parameter optimization module 1210.

Using network 1212, system server 1202 can retrieve data from client server 1214. The retrieved data can be saved in memory 1206 or disk 1208. In some cases, system server 1202 can also comprise a web server, and can format resources into a format suitable to be displayed on a web browser.

Although the algorithms described above including those with reference to the foregoing flow charts have been described separately, it should be understood that any two or more of the algorithms disclosed herein can be combined in any combination. Any of the methods, modules, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.). Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner and can be used separately or in combination.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method for data configuration of a data set for use in a machine learning system of a supply chain system, the method comprising the steps of:
   defining (i) one or more objectives and (ii) one or more supply chain parameters for evaluating each of the one or more objectives;
   generating randomly an initial set of parameters to produce an initial configuration of the data set, wherein generating the initial set of parameters comprises:
      generating a tree structure of the one or more supply chain parameters, the tree structure comprising a plurality of leaf nodes and one or more node levels; and
      generating an initial population of trees;
   evaluating, a fitness function of each of the one or more objectives at each of the plurality of leaf nodes of the population of trees;
   obtaining an initial Pareto Front comprising the leaf nodes that are non-dominated by other leaf nodes;
   applying recursively a genetic algorithm to each of the leaf nodes that form the initial Pareto Front, thereby generating new sets of leaf nodes forming one or more hybrid Pareto fronts, until the initial Pareto Front converges with a final Pareto Front forming a converged Pareto Front;
   generating recommended configurations for the data set based on the leaf nodes on the converged Pareto Front, wherein the leaf nodes on the converged Pareto Front represent the objectives associated with the supply chain parameters;
   selecting one or more of the recommended configurations and configuring the data set using the one or more recommended configurations for use in the machine learning system of the supply chain system; and
   operating the machine learning system of the supply chain system based on the configured data set.

2. The method of claim 1, wherein when applying the genetic algorithm recursively, the method further comprises:
   calculating, a plurality of crowding distances of the leaf nodes and a distance of each parent node; and
   using the plurality of crowding distances and the distances of each parent node to determining pairings at each node level.

3. The method of claim 1, wherein generation of each hybrid Pareto front comprises:
   generating a first converged Pareto front by application of the genetic algorithm to a first set of leaf nodes; and
   generating a second converged Pareto front by application of the genetic algorithm to a first set of parental nodes.

4. The method of claim 1, wherein when applying the genetic algorithm, the method further comprises:
   calculating a plurality of crowding distances of the plurality of leaf nodes; and
   using the plurality of crowding distances to determining pairings of the plurality of leaf nodes.

5. The method of claim 1, wherein the genetic algorithm is a Non-dominated Sorting Genetic Algorithm (NSGA-II).

6. A system for data configuration of a data set for use in a machine learning system of a supply chain system, the system comprising:
   a processor; and a memory storing instructions that, when executed by the processor, configure the system to:

define (i) one or more objectives and (ii) one or more supply chain parameters for evaluating each of the one or more objectives;

generate randomly an initial set of parameters to produce an initial configuration of the data set, wherein generating the initial set of parameters comprises:

generating a tree structure of the one or more supply chain parameters, the tree structure comprising a plurality of leaf nodes and one or more node levels; and generating an initial population of trees;

evaluate a fitness function of each of the one or more objectives at each of the plurality of leaf nodes of the population of trees;

obtain an initial Pareto Front comprising the leaf nodes that are non-dominated by other leaf nodes;

apply recursively, a genetic algorithm to each of the leaf nodes that form the initial Pareto Front, thereby generating new sets of leaf nodes forming one or more hybrid Pareto fronts, until the initial Pareto Front converges with a final Pareto Front forming a converged Pareto Front;

generate recommended configurations for the data set based on the leaf nodes on the converged Pareto Front, wherein the leaf nodes on the converged Pareto Front represent the objectives associated with the supply chain parameters;

select one or more of the recommended configurations and configuring the data set using the one or more recommended configurations for use in the machine learning system of the supply chain system; and, operate the machine learning system of the supply chain system based on the configured data set.

7. The system of claim 6, wherein when applying the genetic algorithm recursively, the system is further configured to:

calculate a plurality of crowding distances of the leaf nodes and a distance of each parent node; and using the plurality of crowding distances and the distances of each parent node to determining pairings at each node level.

8. The system of claim 6, wherein when generating each hybrid Pareto front, the system is further configured to:

generate a first converged Pareto front by application of the genetic algorithm to a first set of leaf nodes; and generate a second converged Pareto front by application of the genetic algorithm to a first set of parental nodes.

9. The system of claim 6, wherein when applying the genetic algorithm, the system is further configured to:

calculate a plurality of crowding distances of the plurality of leaf nodes; and using the plurality of crowding distances to determining pairings of the plurality of leaf nodes.

10. The system of claim 6, wherein the genetic algorithm is a Non-dominated Sorting Genetic Algorithm (NSGA-II).

11. A non-transitory computer-readable storage medium for data configuration of a data set for use in a machine learning system of a supply chain system, the computer-readable storage medium including instructions that when executed by a computer, cause the computer to:

define (i) one or more objectives and (ii) one or more supply chain parameters for evaluating each of the one or more objectives;

generate randomly an initial set of parameters to produce an initial configuration of the data set, wherein generating the initial set of parameters comprises:

generating a tree structure of the one or more supply chain parameters, the tree structure comprising a plurality of leaf nodes and one or more node levels; and generating an initial population of trees;

evaluate a fitness function of each of the one or more objectives at each of the plurality of leaf nodes of the population of trees;

obtain an initial Pareto Front comprising the leaf nodes that are non-dominated by other leaf nodes;

apply recursively a genetic algorithm to each of the leaf nodes that form the initial Pareto Front, thereby generating new sets of leaf nodes forming one or more hybrid Pareto fronts, until the initial Pareto Front converges with a final Pareto Front forming a converged Pareto Front;

generate recommended configurations for the data set based on the leaf nodes on the converged Pareto Front, wherein the leaf nodes on the converged Pareto Front represent the objectives associated with the supply chain parameters;

select one or more of the recommended configurations and configuring the data set using the one or more recommended configurations for use in the machine learning system of the supply chain system; and operate the machine learning system of the supply chain system based on the configured data set.

12. The computer-readable storage medium of claim 11, wherein when applying the genetic algorithm recursively, the instructions that when executed by the computer, further cause the computer to:

calculate a plurality of crowding distances of the leaf nodes and a distance of each parent node; and using the plurality of crowding distances and the distances of each parent node to determining pairings at each node level.

13. The computer-readable storage medium of claim 11, wherein when generating each hybrid Pareto front, the instructions that when executed by the computer, further cause the computer to:

generate a first converged Pareto front by application of the genetic algorithm to a first set of leaf nodes; and generate a second converged Pareto front by application of the genetic algorithm to a first set of parental nodes.

14. The computer-readable storage medium of claim 11, wherein when applying the genetic algorithm, the instructions that when executed by the computer, further cause the computer to:

calculate a plurality of crowding distances of the plurality of leaf nodes; and using the plurality of crowding distances to determining pairings of the plurality of leaf nodes.

15. The computer-readable storage medium of claim 11, wherein the genetic algorithm is a Non-dominated Sorting Genetic Algorithm (NSGA-II).

* * * * *